US008711166B1

(12) United States Patent
Tavares

(10) Patent No.: US 8,711,166 B1
(45) Date of Patent: Apr. 29, 2014

(54) SIMULATING NON POWER OF TWO TEXTURE BEHAVIOR

(75) Inventor: Greggory Alan Tavares, San Francisco, CA (US)

(73) Assignee: Google Inc., Mountain View, CA (US)

(*) Notice: Subject to any disclaimer, the term of this patent is extended or adjusted under 35 U.S.C. 154(b) by 567 days.

(21) Appl. No.: 13/035,055

(22) Filed: Feb. 25, 2011

(51) Int. Cl.
*G09G 5/00* (2006.01)

(52) U.S. Cl.
USPC .......................................................... 345/582

(58) Field of Classification Search
None
See application file for complete search history.

(56) References Cited

U.S. PATENT DOCUMENTS

| 7,324,117 | B1 * | 1/2008 | Donovan ...................... 345/582 |
| 2007/0257924 | A1 | 11/2007 | Quarre et al. |
| 2008/0042923 | A1 | 2/2008 | De Laet |
| 2008/0141131 | A1 | 6/2008 | Cerny et al. |
| 2008/0211827 | A1 | 9/2008 | Donovan et al. |
| 2009/0231332 | A1 | 9/2009 | Woo et al. |
| 2011/0242119 | A1 | 10/2011 | Bolz et al. |

OTHER PUBLICATIONS

Kenneth Russell, Re: [Public WebGL] NPOT (non-power-of-two) textures, published on Jan. 16, 2010, retrieved on Sep. 5, 2013 from https://www.khronos.org/webgl/public-mailing-list/archives/1001/msg00171.html.*

Lee, Hwanyong, and Nakhoon Baek, "Implementing OpenGL ES on OpenGL." Consumer Electronics, 2009. ISCE'09. IEEE 13th International Symposium on. IEEE, 2009.
Pulli, Kari "New APIs for mobile graphics." Proc. SPIE Electronic Imaging: Multimedia on Mobile Devices II 6074 (2006): 1-13.
Hung, Chih-Yang. "OpenGL ES-based Emulator with Performance Tuning in the 3DApplication Development Platform for Embedded Systems." (2009).
"glActiveTexture—select active texture unit" [online], copyrght 1991-2006, http://www.khronos.org/opengles/sdk/docs/man/xhtml/glActiveTexture.xml, 1 page.
"glBind Texture—bind a named texture to a texturing target", [online], copyright 1991-2006, http://www.khronos.org/opengles/sdk/docs/mankhtml/glBindTexture.xml, 2 pages.
"glGenTextures—generate texture names", [online], copyright 1991-2006, http://www.khronos.org/opengles/sdk/docs/man/xhtml/glGenTextures.xml, 2 pages.
"glDeleteTextures—delete named textures", [online], copyright 1991-2006, http://www.khronos.org/opengles/sdk/docs/man/xhtml/glDeleteTextures.xml, 2 pages.
"glCopyTexImage2D—copy pixels into a 2D texture image", [online], copyright 1991-2006, http://www.khronos.org/opengles/sdk/docs/man/xhtml/glCopyTexImage2D.xml, 3 pages.

(Continued)

*Primary Examiner* — Kee M Tung
*Assistant Examiner* — Haixia Du
(74) *Attorney, Agent, or Firm* — Lerner, David, Littenberg, Krumholz & Mentlik, LLP

(57) ABSTRACT

Aspects of the invention relate generally to enforcing elements of the OpenGL ES specification. More specifically, regardless of whether or not the underlying API system would allow NPOT textures, the systems and methods herein may disallow them. As a result, objects bound with these textures may be considered errors, non-renderable, and rendered in black. In order to accomplish this, various functions may be tracked to determine whether an NPOT texture that uses mips is being bound to an object, and if so, treat the condition as an error and bind (then draw) the object with a black texture.

18 Claims, 12 Drawing Sheets

(56) References Cited

OTHER PUBLICATIONS

"glCompressedTexImage2D—specify a two-dimensional texture image in a compressed format", [online], copyright 1991-2006, http://www.khronos.org/opengles/sdk/docs/man/xhtml/glCompressedTexImage2D.xml, 3 pages.
"glLinkProgram—link a program object" [online], copyright 2003-2005, http://www.khronos.org/opoengles/sdk/docs/man/xhtml/glLinkProgram.xml, 3 pages.
"glTexImage2D—specify a two-dimensional texture image", [online], copyright 1991-2006, http://www.khronos.org/opengles/sdk/docs/man/xhtml/glTexImage2D.xml, 4 pages.
"glTexParameter—set texture parameters", [online], copyright 1991-2006, http://www.khronos.org/opengles/sdk/docs/man/xhtml/glTexParameter.xml, 5 pages.
"glUseProgram—install a program object as part of current rendering state", [online], copyright 2003-2005, http://www.khronos.org/opengles/sdk/docs/man/xhtml/glUseProgram.xml, 2 pages.
"glUniform—specify the value of a uniform variable for the current program object" [online], Copyright 2003-2005, http://www.khronos.org/opengles/sdk/docs/man/xhtml/glUniform.xml, 6 pages.
"Man page VertexAttribPointer—define an array of generic vertex attribute data" [online]. Retrieved Feb. 9, 2011: http://www.khronos.org/opengles/sdk/docs/man/xhtml/glVertexAttribPointer.xml, 3 pages.
"Man page glUseProgram—install a program object as part of current rendering state" [online] Retrieved Feb. 9, 2011. Retrieved from the internet: http://www.khronos.org/opengles/sdk/docs/man/xhtml/glUseProgram.xml, 2 pages.
"Man page glLinkProgram—link a program object" [online]. [Retrieved Feb. 9, 2011]. Retrieved from the internet: http://www.khronos.org/opengles/sdk/docs/man/xhtml/glLinkProgram.xml, 3 pages.
"Man page glGenBuffers—generate buffer object names" [online]. [Retrieved Feb. 9, 2011]. Retrieved from the internet: http://www.khronos.org/opengles/sdk/docs/man/xhtml/glGenBuffers.xml, 2 pages.
"Man page glEnableVertexAttribArray—enable or disable a generic vertex attribute array" [online]. [Retrieved Feb. 9, 2011]. Retrieved from the internet: http://www.khronos.org/opengles/sdk/docs/man/xhtml/glEnableVertexAttribArray.xml, 2 pages.
"Man page glDrawArrays—render primitives from array data" [online]. [Retrieved Feb. 9, 2011]. Retrieved from the internet: http://www.khronos.org/opengles/sdk/docs/man/xhtml/glDrawElements.xml, 2 pages.
"Man page glDrawElements—render primitives from array data" [online]. [Retrieved Feb. 9, 2011] Retrieved from the internet: http://www.khronos.org/opengles/sdk/docs/man/xhtml/glDrawArrays.xml, 2 pages.
"Man page glDelet3eBuffers—delete named buffer objects" [online]. {Retrieved Feb. 9, 2011. Retrieved from the internet: http://www.khronos.org/opengles/sdk/docs/man/xhtml/glDeleteBuffers.xml, 1 page.
"Man page glBufferSubData—update a subset of a buffer object's data store" [online]. [Retrieved Feb. 9, 2011]. Retrieved from the internet: http://www.khronos.org/opengles/sdk/docs/man/xhtml/glBufferSubData.xml, 2 pages.
"Man page glBufferData—create and initialize a buffer object's data store" [online]. [Retrieved Feb. 9, 2011]. Retrieved from the internet: http://www.khronos.org/opengles/sdk/docs/man/xhtml/glBufferData.xml, 3 pages.
"Man page glBindBuffer—bind a named buffer object" [online]. [Retrieved Feb. 9, 2011]. Retrieved from the internet: http://www.khronos.org/opengles/sdk/docs/man/xhtml/glBindBuffer.xml, 2 pages.
"Log of/trunk/src/gpu/command_buffer/service/shader_manager.cc" [online]. [Retrieved Feb. 9, 2011]. Retrieved from the internet: http://src.chromium.org/viewvc/chrome/trunk/src/gpu/command_buffer/service/shader_manager.cc?view=log, 3 pages.
Log of/trunk/src/gpu/command_buffer/service/shader_manager.h [online]. [Retrieved Feb. 9, 2011]. Retrieved from the internet: http://src.chromium.org/viewvc/chrome/trunk/src/gpu/command_buffer/service/shader_manager.h?view=log, 5 pages.
Log of/trunk/src/gpu/command_buffer/service/program_manager.cc [online]. [retrieved Feb. 9, 2011]. Retrieved from the internet: http://srv.chromium.org/viewvc/chrome/trunk/srv/gpu/command_buffer/service/program_manager.cc?view=log, 7 pages.
"Log of/trunk/src/gpu/command_buffer/service/program_manager.h" [online]. [Retrieved Feb. 9, 2011]. Retrieved from the internet: http://src.chromium.org/viewvc/chrome/trunk/src/gpu/command_buffer/service/program_manager.cc?view=log, 6 pages.
"Log of/trunk/src/gpu/command_buffer/service/buffer" [online]. [Retrieved Feb. 9, 2011]. Retrieved from the internet: http:// src.chromium.org/viewvc/chrome/trunk/src/gpu/command_buffer/service/buffer_manager.cc?view=log, 6 pages.
"Log of/trunk/src/gpu/command_buffer/service/buffer_manager.h" [online]. [retrieved Feb. 9, 2011]. Retrieved from internet: http://src.chromium.org/viewvc/chrome/trunk/src/gpu/command_buffer/service/program_manager.h?view=log, 6 pages.
"View of/trunk/src/gpu/command_buffer/service/gles2_cmd_decoder_autogen.h" [online]. [Retrieved Feb. 9, 2011]. Retrieved from the internet: http://src.chromium.org/viewvc/chrome/trunk/src/gpu/command_buffer/service/gles2_and_decoder_autogen.h?view=markup, 46 pages.
"View of trunk/src/gpu/command_buffer/service/gles2_cmd_decoder.cc" [online]. [Retrieved Feb. 9, 2011]. Retrieved from the internet: http://src.chromium.org/viewvc/chrome/trunk/src/gpu/command_buffer/service/gles2_cmd_decoder.cc?view=markup, 104 pages.
"View of/trunk/src/gpu/command_buffer/client/gles2_cmd_helper.cc" [online]. [Retrieved Feb. 9, 2011]. Retrieved from the internet: http://src.chromium.org/viewvc/chrome/trunk/src/gpu/command_buffer/client/gles2_cmd_helper.cc?view=markup, 1 page.
"View of/trunk/src/gpu/command_buffer/client/gles2_cmd_helper.h" [online]. [Retrieved Feb. 9, 2011]. Retrieved from the internet: http://src.chromium.org/viewvc/chrome/trunk/src/gpu/command_buffer/client/gles2_cmd_helper.h?view=markup, 3 pages.
"View of/trunk/src/gpu/command_buffer/client/gles2_implementation.cc" [online]. [Retrieved Feb. 9, 2011]. Retrieved from the internet: http://src.chromium.org/viewvc/chrome/trunk/src/gpu/command_buffer/client/gles2_implementation.cc?view=markup, 29 pages.
"View of/trunk/src/gpu/command_buffer/client/gles2_cmd_helper.h" [online]. [Retrieved Feb. 9, 2011]. Retrieved from the internet: http://src.chromium.org/viewvc/chrome/trunk/src/gpu/command_buffer/client/gles2_cmd_helper.h? view=markup, 3 pages.
"Log of/trunk/src/gpu/command_buffer/client/gles2_implementation_autogen.h" [online]. [Retrieved Feb. 9, 2011]. Retrieved from the internet: http://src.chromium.org/viewvc/chrome/trunk/src/gpu/command_buffer/client/gles2_implementation_autogen.h?view=markup, 16 pages.
"Log of trunk/src/gpu/commpand_buffer/client/gles2_implementation.h" [online]. [Retrieved Feb. 9, 2011]/ Retrieved from the internet: http://src.chromium.org/viewvc/chrome/trunk/src/gpu/command_buffer/client/gles2_implementation.h?view=markup, 7 pages.
"Log of trunk/src/gpu/command_buffer/client/gles2_c_lib_autogen.h" [online]. [Retrieved Feb. 9, 2011]. Retrieved from the internet: http://src.chromium.org/viewvc/chrome/trunk/src/gpu/command_buffer/client/gles2_c_lib_autogen.h?view=markup, 16 pages.
"glGetVertexAttrib—return a generic vertex attribute parameter", [online], copyright 2003-2005, http://www.khronos.org/opengles/sdk/docs/man/xhtml/glGetVertexAttrib.xml, 3 pages.
"glGetVertexAttribPointerv—return the address of the specified generic vertex attribute pointer", [online], copyright 2003-2005, http://www.khronos.org/opengles/sdk/docs/man/xhtml/glGetVertexAttribPointerv.xml, 2 pages.

(56) References Cited

OTHER PUBLICATIONS

"glVertexAttrib—specify the value of a generic vertix attribute", [online], copyright 2003-2005, http://www.khronos.org/opengles/sdk/docs/man/xhtml/glVertexAttrib.xml, 3 pages.

"glEnableVertexAttribArray—enable or disable a generic vertex attribute array", [online], copyright 2003-2005, http://www.khronos.org/opengles/sdk/docs/man/xhtml/glEnableVertexAttribArray.xml, 2 pages.

"glDrawArrays—render primitives from array data", [online], copyright 1991-2006, http://www.khronos.org/opengles/sdk/docs/man/xhtml/glDrawArrays.xml, 2 pages.

"glDrawElements—render primitives from array data", [online], copyright 1991-2006, http://www.khronos.org/opengles/sdk/docs/man/xhtml/glDrawElements.xml, 2 pages.

* cited by examiner

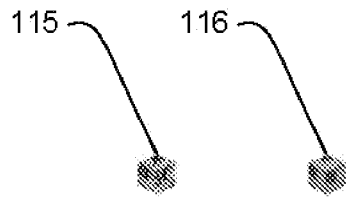
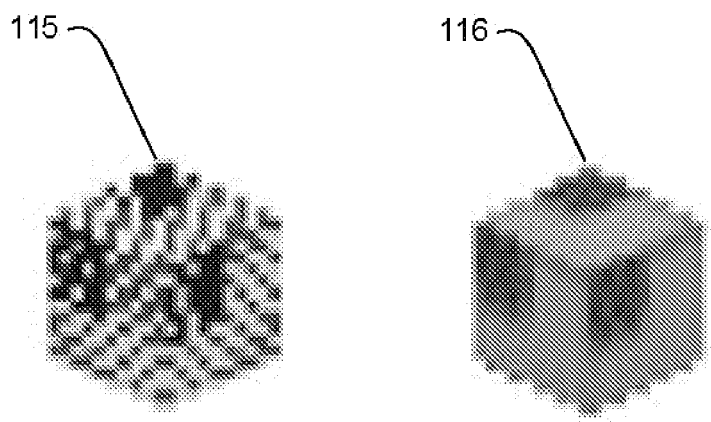
FIGURE 1F
(PRIOR ART)

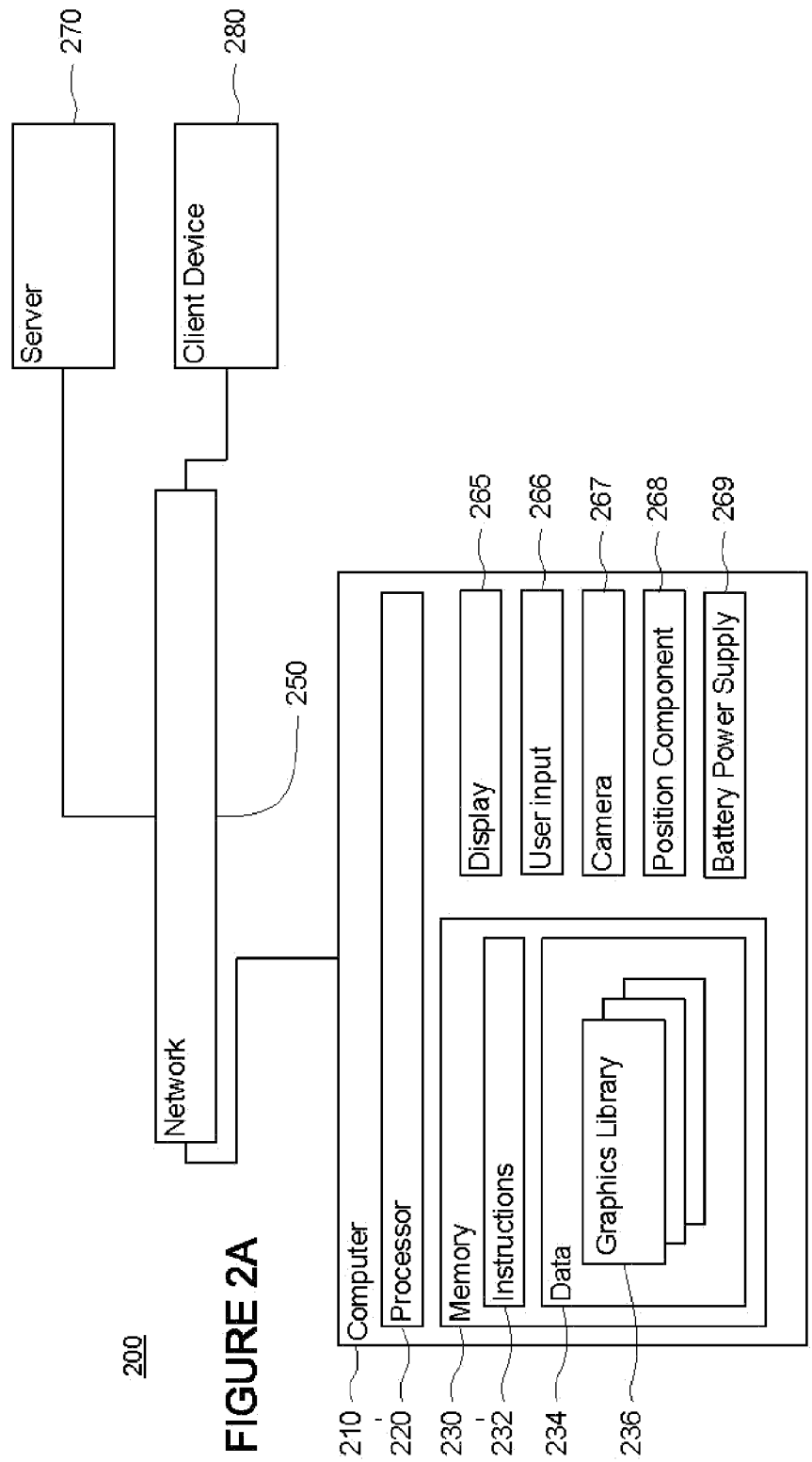

500

```
┌─────────────────────────────┐
│ Receive request to call glDraw │
│ function to bind one or more   │
│ textures to a respective object│
│ 502                            │
└─────────────────────────────┘
              │
              ▼
┌─────────────────────────────┐
│ Identify a plurality of textures│
│ including the one or more textures│
│ 504                            │
└─────────────────────────────┘
              │
              ▼
┌─────────────────────────────┐
│ For each texture of the plurality of│
│ textures, determine whether the│
│ 506      texture is NPOT       │
└─────────────────────────────┘
              │
              ▼
┌─────────────────────────────┐
│ For each NPOT texture determine│
│ whether the texture is set to use│
│ 508            mips            │
└─────────────────────────────┘
              │
              ▼
┌─────────────────────────────┐
│ For each of the one or more    │
│ textures which is NPOT and set to│
│ use mips, bind a black texture to│
│ the respective object, and draw│
│ 510    the object in black     │
└─────────────────────────────┘
              │
              ▼
┌─────────────────────────────┐
│ Call the real glDraw function  │
│ 512                            │
└─────────────────────────────┘
              │
              ▼
┌─────────────────────────────┐
│ Bind the one or more textures to│
│ the respective object identified in│
│ 514     the original request   │
└─────────────────────────────┘
```

FIGURE 5

SIMULATING NON POWER OF TWO TEXTURE BEHAVIOR

BACKGROUND OF THE INVENTION

Graphics application programming interfaces ("API") are used by programmers to create 2D and 3D graphics. The Open Graphics Library ("Open GL") is a widely used API. The Open GL architecture allows programmers to produce consistent visual display results on any OpenGL API-compliant hardware regardless of the operating system. OpenGL for embedded systems ("OpenGL ES") is a subset of the OpenGL API designed for embedded devices such as mobile phones, PDAs, and video game consoles.

OpenGL and OpenGL ES may use "textures" or images that are generally used to give 3d objects greater detail. For example, as shown in FIG. 1A, cube 100 is not textured. FIG. 1B depicts a texture 102 which may be applied to cube 100 to generate cube 104 shown in FIG. 1C. When cube 104 is drawn, the system must determine which colors to draw it and make the texture "fit" to the object. In one example, for each pixel in cube 104, the system will choose 1 or 4 pixels from texture 102 and average them together. Which pixels the system selects may vary depending upon the texture and the object. For example, if the texture of FIG. 1B is red, white and blue, the system may select a red, white or blue pixel. As a result of using these averages, when cube 104 is rotated, the cube may actually flicker different colors as it moves around the view.

In order to avoid flickering and increase efficiency, OpenGL and OpenGL ES may use "mipmapping." Mipmapping allows the system to generate smaller versions of textures called "mipmaps" or "mips." Each mip may be ¼ the size of the previous one. For each mip, the colors of the original texture (or the next larger mip) may be used to compute what color the smaller mip should be. As shown in FIG. 1D, mips 105-112 may be considered smaller versions of texture 102, each being some combination of red, white, and blue pixels. The smallest mip may be a 1×1 pixel map. FIG. 1E is an enlargement of mips 107-112.

When the system draws a cube with a texture that uses mips, it may choose the appropriately sized mip. For example, if the cube is so small or far away that it is only 1 pixel large, the system will choose the smallest mip. If there is only 1 pixel in the smallest mip, the flickering may now be fixed. In some examples, the mips may make the image clearer. For example, FIG. 1F depicts two textured cubes, 115 drawn using the "average" method described above and 116 using the "mip" method.

Most of the various versions of OpenGL allow texture to be drawn in any dimension up to a certain maximum size. The base specifications for OpenGL and OpenGL ES require that if (a) a texture has mips and (b) the texture has been set to use mips, the texture's dimensions must be a power of 2. In other words, the width and height of the texture must be 1, 2, 4, 8, 16, 32, 64, 128, etc., up to the maximum power of two that the particular version of GL allows. For example, a texture that is 128×64 pixels is a power of 2 ("POT") texture. A texture that is 127×64 is a non power of 2 ("NPOT") texture. The base OpenGL specification designates NPOTs as an error. As a result, the system will ignore the NPOT texture and instead treat the texture as though it was all black. Many versions of OpenGL have optional extensions which remove this restriction. These extensions allow NPOT textures to be drawn just like POT textures.

However, many computing systems do not support these extensions. If a programmer prepares a program assuming that the extensions exist (as they do on his personal machine), he may prepare his program only later to discover that the program may not work on systems which do not utilize these extensions.

BRIEF SUMMARY OF THE INVENTION

Aspects of the invention relate generally to enforcing elements of the OpenGL ES specification. More specifically, regardless of whether or not the underlying API system would allow NPOT textures, the systems and methods described herein may disallow them. As a result, objects bound with these textures may be considered errors, non-renderable, and/or rendered in black. In order to accomplish this, various functions may be tracked to determine whether an NPOT texture that uses mips is being bound to an object, and if so, treat the condition as an error and bind (then draw) the object with a black texture. Later, the NPOT texture which uses mips may be bound to the object such that when the user queries for which texture was bound to the object, the user will not know that a black texture was bound. The user may then "correct" the black object, by replacing the NPOT texture with a power of two texture. Thus, a user using an OpenGL emulator with the features described herein may be able to generate images with the same characteristics for devices using either OpenGL or OpenGL ES. This effectively removes the need for extensions and results in code or images which will be displayed the same way on computing systems which support OpenGL or OpenGL ES.

One aspect of the invention provides a computer-implemented method for binding textures and generating an image of an object using a graphics library including functions and elements. The method includes receiving a request from a user to use a first function to bind one or more textures to the object and to draw the object and identifying a plurality of textures including the one or more textures. For each texture of the plurality of textures, a processor determines whether the texture is an NPOT texture comprising a length dimension or a width dimension which is not a power of 2. For each NPOT texture, whether that texture is set to use mips is also determined. For each of the one or more textures which is an NPOT texture and set to use mips, a black texture is bound to the object and the object is drawn in black. The first function is called and after drawing the object in black, the one or more textures is bound to the object. In one example, any of the one or more NPOT textures set to use mips is drawn in black.

Another aspect of the invention provides a computer-implemented method for binding textures and generating an image of an object using a graphics library including functions and elements. The method includes generating a variable to track a number of NPOT textures comprising a length dimension or a width dimension which is not a power of 2, the NPOT textures being set to use mips; tracking the use of a first function; setting a value for the variable based on the use of the second function; and receiving a request from a user to use a second function to bind one or more textures to the object and draw the object. If the value indicates that there are NPOT textures set to use mips, then the method also includes: (a) identifying a plurality of textures including the one or more textures; (b) for each texture of the plurality of textures, determining, by a processor, whether the texture is an NPOT texture; (c) for each NPOT texture, determining whether the texture is set to use mips; (d) for each of the one or more textures which is an NPOT texture and set to use mips, binding a black texture to the object; (e) drawing the object in black; (f) calling the second function; and (g) after drawing the object in black, binding the one or more textures to the object.

In one example, if the value indicates that there are no NPOT textures set to use mips, then the method also includes calling the second function and binding the one or more textures to the object. In another example, the method also includes drawing any of the one or more NPOT textures set to use mips in black.

Yet another aspect of the invention provides a computer-implemented method for binding textures and generating an image of an object using a graphics library including functions and elements. The method includes generating a variable to track a number of NPOT textures comprising a length dimension or a width dimension which is not a power of 2, and which are set to use mips; tracking the use of a first function; setting a value for the variable based on the use of the first function; tracking the use of a second function; identifying, by a processor, a plurality of textures of the library; identifying N texture binding locations based on the use of the second function, where each of the N texture binding location is associated with a respective texture of the plurality of textures; and receiving a request from a user to use a third function to bind one or more textures to the object and draw the object. If the value indicates that there are NPOT textures set to use mips, the method also includes (a) for each of the N texture binding locations, the processor determining whether the respective texture is an NPOT texture; (b) for each NPOT texture, determining whether the texture is set to use mips; (c) for each of the one or more textures which is an NPOT texture and set to use mips, binding a black texture to the object; (d) drawing the object in black; (e) calling the third function; and (f) after drawing the object in black, binding the one or more textures to the object.

In one example, if the value indicates that there are no NPOT textures set to use mips, the method also includes calling the first function and binding the one or more textures to the object. In another example, the method also includes drawing any of the one or more NPOT textures set to use mips in black.

Still a further aspect of the invention provides a computer-implemented method for binding textures and generating an image of an object using a graphics library including functions and elements. The method also includes generating a variable to track a number of NPOT textures each comprising a length dimension or a width dimension which is not a power of 2, the NPOT textures being set to use mips; tracking the use of a first function; setting a value for the variable based on the use of the first function; tracking the use of a second function; identifying, by a processor, a plurality of textures of the library; identifying N texture binding locations based on the use of the second function, where each of the N texture binding locations is associated with a respective texture of the plurality of textures; tracking the use of a third function; identifying one or more of the N texture binding locations based on the use of the third function; and receiving a request from a user to use a fourth function to bind one or more textures to the object and draw the object. If the value indicates that there are NPOT textures set to use mips, the method also includes (a) for each of the identified one or more N texture binding locations, determining by the processor whether the respective texture is an NPOT texture; (b) for each NPOT texture, determining whether the texture is set to use mips; (c) for each of the one or more textures which is an NPOT texture and set to use mips, binding a black texture to the object; (d) drawing the object in black; (e) calling the fourth function; and (f) after drawing the object in black, binding the one or more textures to the object.

In one example if the value indicates that there are no NPOT textures set to use mips, the method also includes calling the first function and binding the one or more textures to the object. In another example, the method also includes drawing any of the one or more NPOT textures set to use mips in black.

A further aspect of the invention provides a computer. The computer includes memory storing a graphics library including functions and elements for binding textures and generating an image of an object. The computer also includes a processor coupled to the memory. The processor is operable to receive a request from a user to use a first function to bind one or more textures to the object and to draw the object and identify a plurality of textures including the one or more textures. For each texture of the plurality of textures, the processor is operable to determine whether the texture is an NPOT texture comprising a length dimension or a width dimension which is not a power of 2. For each NPOT texture, the processor is operable to determine whether that texture is set to use mips. For each of the one or more textures which is an NPOT texture and set to use mips, the processor is operable to bind a black texture to the object. The processor is also operable to draw the object in black, call the first function, and after the object is drawn in black, bind the one or more textures to the object.

In one example, the processor is also operable to draw any of the one or more NPOT textures set to use mips in black.

Yet a further aspect of the invention provides a computer. The computer includes memory storing a graphics library including functions and elements for binding textures and generating an image of an object. The computer also includes a processor coupled to the memory. The processor is operable to generate a variable to track a number of NPOT textures comprising a length dimension or a width dimension which is not a power of 2, the NPOT textures being set to use mips; track the use of a first function. The processor is also operable to set a value for the variable based on the use of the second function and receive a request from a user to use a second function to bind one or more textures to the object and draw the object. If the value indicates that there are NPOT textures set to use mips, the processor is operable to: (a) identify a plurality of textures including the one or more textures; (b) for each texture of the plurality of textures, determine whether the texture is an NPOT texture; (c) for each NPOT texture, determine whether the texture is set to use mips; (d) for each of the one or more textures which is an NPOT texture and set to use mips, bind a black texture to the object; (e) draw the object in black; (f) call the second function; and (g) after the object is drawn in black, bind the one or more textures to the object.

In one example, the processor is also operable to, if the value indicates that there are no NPOT textures set to use mips, (a) call the second function and (b) bind the one or more textures to the object. In another example, the processor is also operable to draw any of the one or more NPOT textures set to use mips in black.

Another aspect of the invention provides a computer. The computer includes memory storing a graphics library including functions and elements for binding textures and generating an image of an object. The computer also includes a processor coupled to the memory. The processor is operable to generate a variable to track a number of NPOT textures comprising a length dimension or a width dimension which is not a power of 2, and which are set to use mips; track the use of a first function; set a value for the variable based on the use of the first function; and track the use of a second function. The processor is also operable to identify a plurality of textures of the library; identify N texture binding locations based on the use of the second function, where each of the N texture binding location is associated with a respective texture of the plurality of textures; and receive a request from a user to use a third function to bind one or more textures to the object and draw the object. If the value indicates that there are NPOT textures set to use mips, the processor is also operable to (a) for each of the N texture binding locations, determine whether the respective texture is an NPOT texture; (b) for each NPOT texture, determine whether the texture is set to use mips; (c) for each of the one or more textures which is an NPOT texture and set to use mips, bind a black texture to the object; (d) draw the object in black; (e) call the third function; and (f) after the object is drawn in black, bind the one or more textures to the object.

In one example, the processor is also operable to, if the value indicates that there are no NPOT textures set to use mips, call the first function and bind the one or more textures to the object. In another example, the processor is further operable to draw any of the one or more NPOT textures set to use mips in black.

Still a further aspect of the invention provides a computer. The computer includes memory storing a graphics library including functions and elements for binding textures and generating an image of an object. The computer also includes a processor coupled to the memory. The processor is operable to generate a variable to track a number of NPOT textures each comprising a length dimension or a width dimension which is not a power of 2, the NPOT textures being set to use mips; track the use of a first function; set a value for the variable based on the use of the first function; track the use of a second function; and identify a plurality of textures of the library. The processor is also operable to identify N texture binding locations based on the use of the second function, where each of the N texture binding locations is associated with a respective texture of the plurality of textures; track the use of a third function; identify one or more of the N texture binding locations based on the use of the third function; and receive a request from a user to use a fourth function to bind one or more textures to the object and draw the object. If the value indicates that there are NPOT textures set to use mips, the method also includes (a) for each of the identified one or more N texture binding locations, determine whether the respective texture is an NPOT texture; (b) for each NPOT texture, determine whether the texture is set to use mips; (c) for each of the one or more textures which is an NPOT texture and set to use mips, bind a black texture to the object; (d) draw the object in black; (e) call the fourth function; and (f) after the object is drawn in black, bind the one or more textures to the object.

In one example the processor further operable to, if the value indicates that there are no NPOT textures set to use mips, call the first function and bind the one or more textures to the object. In another example, the processor also operable to draw any of the one or more NPOT textures set to use mips in black.

BRIEF DESCRIPTION OF THE DRAWINGS

FIG. 1F is a diagram of exemplary textured cubes in accordance with the prior art.

FIG. 2A is a functional diagram of a system in accordance with an aspect of the invention.

FIG. 5 is a flow diagram in accordance with an aspect of the invention.

DETAILED DESCRIPTION

In one aspect of the invention, an emulator program may receive a request to call a particular function from a library. The particular function may render primitives from array data to bind one or more textures to a respective object and draw the object. A plurality of textures, including the one or more textures, may be identified. The plurality of textures may, for example, include all of the textures in the library. For each texture of the plurality of textures, the emulator determines whether the texture is NPOT. For each NPOT texture, the emulator determines whether the texture is set to use mips. For each of the one or more textures which is NPOT and set to use mips, the emulator binds a black texture to the respective object and draw the object in black. Next, the particular function (as identified in the request) may be called. The particular function may be used to bind the one or more textures to the respective object identified in the original request. Accordingly, when a user queries the emulator to identify which textures have been bound, the user may receive the one or more textures of the request, and not the black texture which was bound to complete the draw.

Figure 1A:
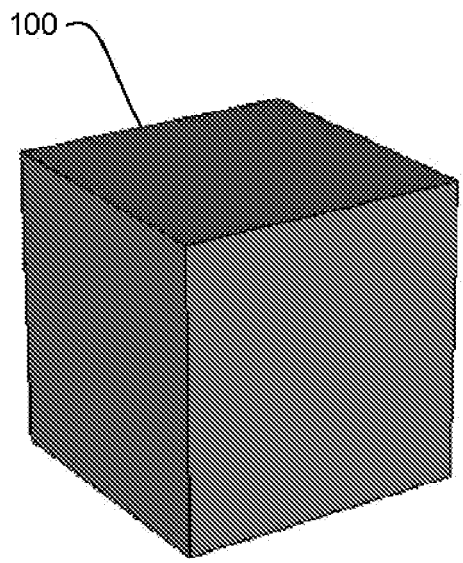
FIG. 1A is a non-textured cube in accordance with the prior art.
Figure 1B:
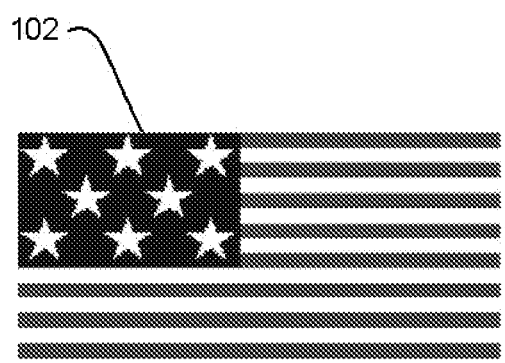
FIG. 1B is an exemplary texture in accordance with the prior art.
Figure 1C:
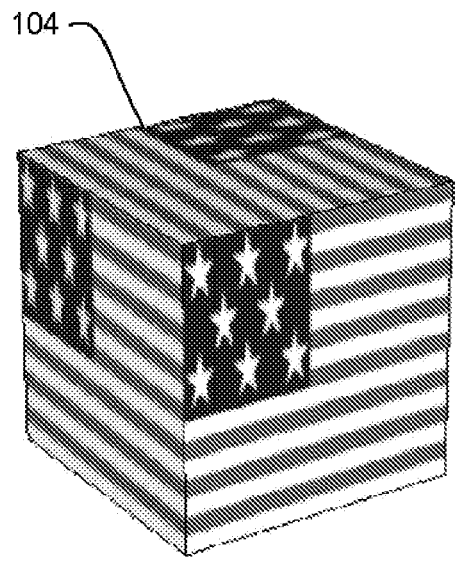
FIG. 1C is an exemplary textured cube in accordance with the prior art.
Figure 1D:
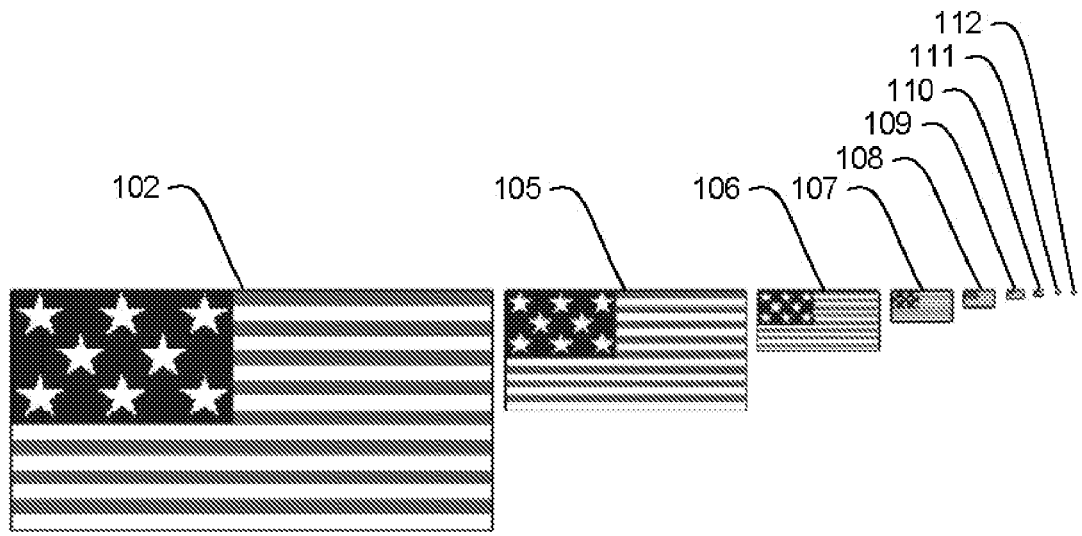
FIG. 1D is an exemplary texture and exemplary mips in accordance with the prior art.
Figure 1E:
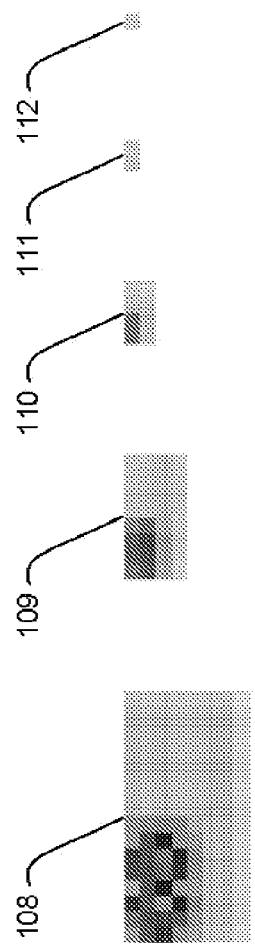
FIG. 1E is exemplary mips in accordance with the prior art.
Figure 2B:
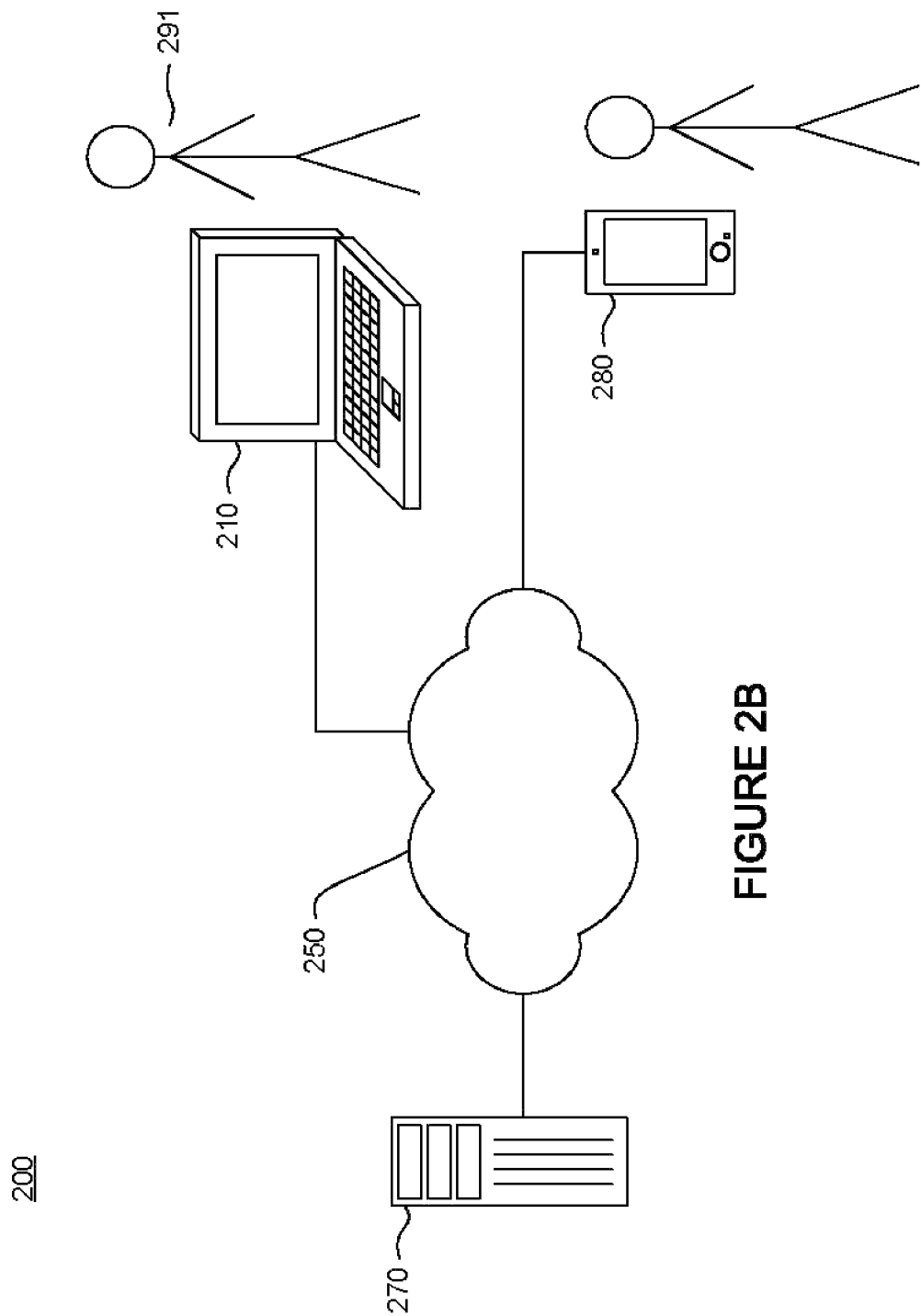
FIG. 2B is a pictorial diagram of the system of FIG. 2A.

As shown in FIGS. 2A-B, a system 200 in accordance with one aspect of the invention includes a computer 210 containing a processor 220, memory 230 and other components typically present in general purpose computers.

The memory 230 stores information accessible by processor 220, including instructions 232, and data 234 that may be executed or otherwise used by the processor 220. The memory 230 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 232 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 234 may be retrieved, stored or modified by processor 220 in accordance with the instructions 232. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 220 may be any conventional processor, such as processors from Intel Corporation or Advanced Micro Devices. Alternatively, the processor may be a dedicated controller such as an ASIC. Although FIG. 2A functionally illustrates the processor and memory as being within the same block, it may be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer or memory may be understood to include references to a collection of processors or computers or memories that may or may not operate in parallel.

The computer 210 may be at one node of a network 250 and capable of directly and indirectly receiving data from other nodes of the network. Computer 210 may be a client device capable of sending and receiving information with other devices, such as client device 280 and server 270, on the network. The client device may send and receive information over the network and display information to a user on display 265. Computer 210 may also comprise a plurality of computers that exchange information with different nodes of a network for the purpose of receiving, processing and transmitting data.

Network 250, and intervening nodes between client 210 and other devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 2A-B, it should be appreciated that a typical system can include a large number of connected computers.

Computer 210 may be a personal computer intended for use by a person 291, and have all of the components normally used in connection with a personal computer such as an electronic display 265 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 267, position component 268, accelerometer, speakers, a network interface device, a battery power supply 269 or other power source, and all of the components used for connecting these elements to one another.

Although client device 210 may comprise a full-sized personal computer, it may alternatively comprise mobile devices capable of wirelessly exchanging data with a server over a network such as the Internet. By way of example only, client device 210 may be a wireless-enabled PDA, a cellular phone, netbook, or tablet PC capable of obtaining information via the Internet or other network. The user may input information using a small keyboard, a keypad, or a touch screen.

Data 234 may include a graphics library 236 of functions and elements used to draw graphics or images. For example, the graphics library may include the OpenGL and OpenGL ES libraries. This information may be used by a set of instructions, for example, an emulator, in order to allow a programmer to generate 2D or 3D graphics.

The graphics library may include various information, such as the textures and mips described above, which may be used by client devices to render images from memory. The library may also include functions which operate on textures. For example, these functions may include functions that: select an active texture unit (such as glActiveTexture), bind a named texture to a texturing target (such as glBindTexture), generate texture names (such as glGenTextures), delete named textures (such as glDeleteTextures), copy pixels into a 2D texture image (such as glCopyTexImage2D), specify a two-dimensional texture image in a compressed format (such as glCompressedTexImage2D), link a program object such as (such as glLinkProgram), specify a two-dimensional texture image (such as glTexImage2D), set texture parameters (such as glTexParameter), install a program object as part of current rendering state (such as glUseProgram), specify the value of a uniform variable for the current program object (such as glUniform), and render primitives from array data (such as glDrawArrays or glDrawElements).

The library may also include secondary or different versions of the functions described above. For example, these different versions may be used to track and record when the "real" function is created, edited, used, etc. In some examples, the different versions may be "wrapped" versions of the real function. The wrapped versions may include a wrapper or set of code which operates on a function to determine how the function is executed.

Figure 3:
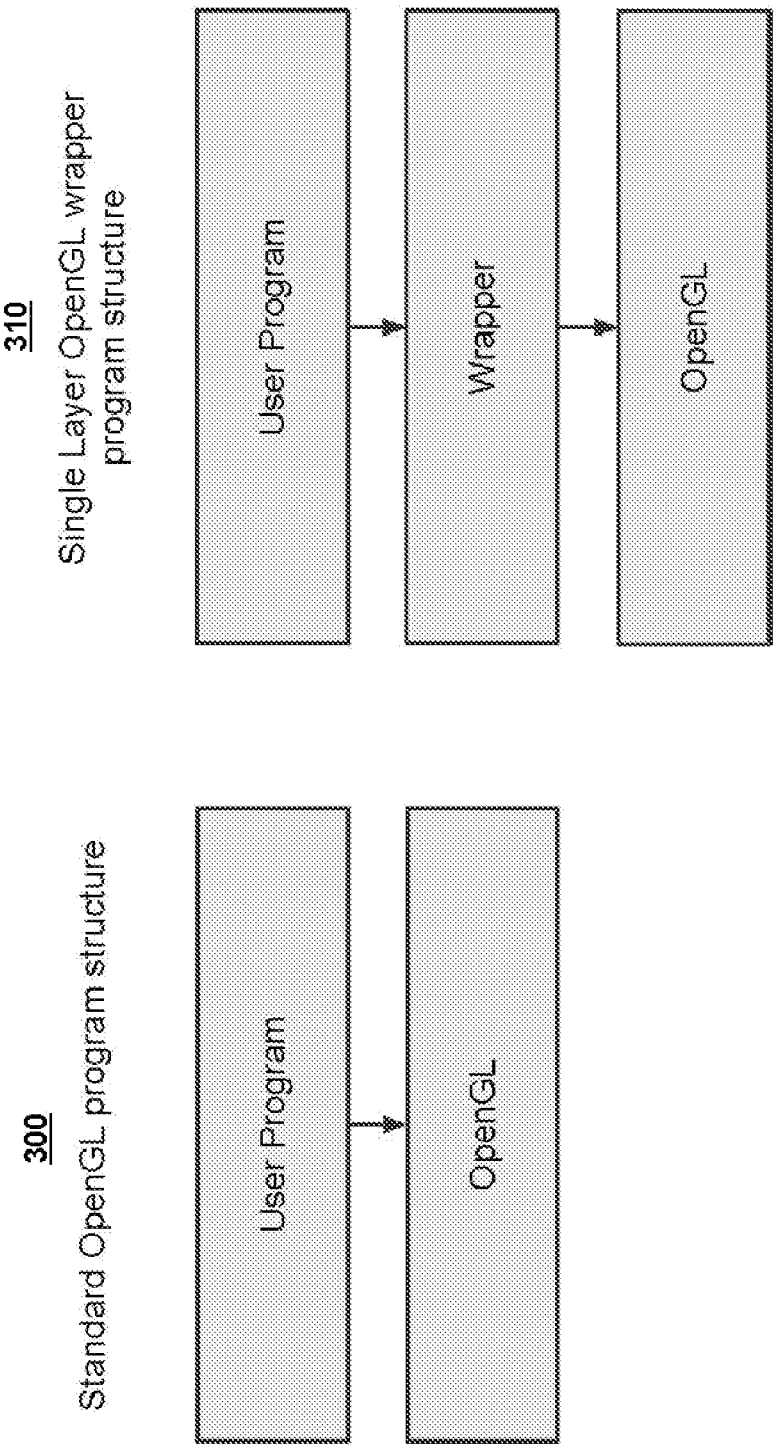
FIG. 3 is a diagram of an exemplary wrapper in accordance with an aspect of the invention.

The processor may use the wrappers to monitor the use of the functions and recall their various states. For example, the wrappers may include a single layer or may be multilayered. Diagram 300 of FIG. 3 shows that a standard OpenGL program structure includes the user program (which calls the functions) and OpenGL. The single layer wrapper of diagram 310 acts as an intermediary between the user program and OpenGL.

Figure 4:
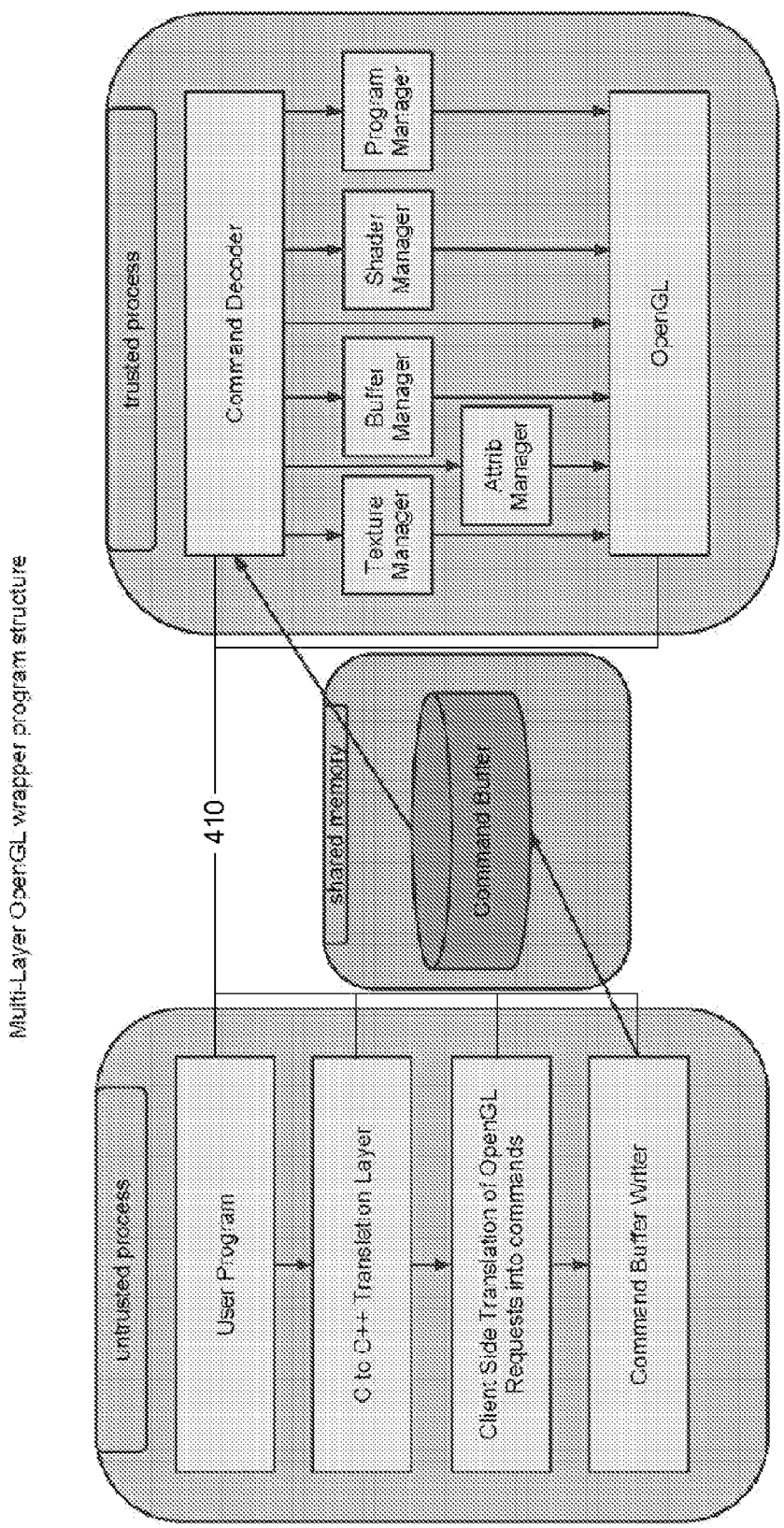
FIG. 4 is another diagram of an exemplary wrapper in accordance with an aspect of the invention.

In another example, shown in FIG. 4, the wrapper may have multiple layers, where each particular layer 410 is depicted as a rectangular block. The first level may include the OpenGL file that defines the OpenGL functions (the "official file"). Minor modifications to this file may allow the emulator to change the calls for the OpenGL ES functions to the calls for the wrappers themselves. In one example, a user program may call a particular function to perform some task. In response, the official file may actually call the particular function's wrapper (or the wrapped version of the function). This may be the second layer of the wrapper. The functions in this second layer of the wrapper may translate from C to C++ and call the third layer of the wrapper. The third layer then uses the C++ to instruct the fourth layer of the wrapper to write commands to memory using a set of low level features. In some examples, these low level features may be defined in about 50 different files. The commands may be read out of the fifth layer. The fifth layer then calls the real OpenGL function to complete some action. This fifth layer may also utilize a set of classes to assist it in recording values.

Various wrapping techniques may be used so long as the emulator is able to perform the operations described herein with regard to each particular function type.

In addition to the features described above, the library may also include additional features known as "shader" programs. These shaders may be mini programs that the emulator uses to draw images. The shader programs may be defined by a user. Each shader identifies inputs called "uniforms," which may include textures.

Various operations in accordance with aspects of the invention may now be described. It should also be understood that the following operations do not have to be performed in the precise order described below. Rather, various steps can be handled in a different order or simultaneously, and steps may be added or removed.

A user (here, a programmer) may use the API to draw 3D graphics. For example, the user selects an object and a texture to bind to the object. The user may then call glDrawArrays or glDrawElements to bind the texture to the object. Rather than calling the real glDraw (Arrays or Elements) function, the emulator may call a wrapped version of the function and use the wrapped version to examine the state of all of the textures of the library. For each texture identified, the emulator may query OpenGL and determine whether the texture is NPOT. If the texture is NPOT, the emulator may also determine whether the texture is set to use mips. If the texture is NPOT and set to use mips, this may be recognized as an error condition. Rather than binding the texture (or appropriate mip) to the object, a default or black texture may be bound to the object and the object may be rendered in black. If the texture is not NPOT or is not set to use mips, the texture (or appropriate mip) may be bound to the object.

Next, the emulator may call the real glDraw function to actually bind the texture to the object. Thereafter, if the user queries OpenGL asking which textures have been bound, the emulator will return the NPOT and mip texture bound to the object. In this regard, the user will see the black object but may conclude that the texture was bound to the object. The user does not know that the black texture was actually bound to the object and the emulator may function just as the user expects the specification to function without using extensions.

As shown in flow diagram 500 of FIG. 5, the emulator may receive a request to call a glDraw function to bind one or more textures to a respective object at block 502. At block 504, a plurality of textures, including the one or more textures, is identified. The plurality of textures may, for example, include all of the textures in the library. For each texture of the plurality of textures, the emulator determines whether the texture is NPOT at block 506. For each NPOT texture, the emulator determines whether the texture is set to use mips at block 508. For each of the one or more textures which is NPOT and set to use mips, the emulator binds a black texture to the respective object and draw the object in black at block 510. Next, the real glDraw function (as identified in the request) is called at block 512. The real glDraw function is then used to bind the one or more textures to the respective object identified in the original request at block 514. Accordingly, when a user queries the emulator to identify which textures have been bound, the user will receive the one or more textures of the request, and not the black texture which was bound, to complete the draw.

In order to check the state of each of the textures to determine whether a particular texture should be drawn in black may require a query to OpenGL for each texture. Querying the state of OpenGL may be very slow, and in fact, as there are multiple textures, and making multiple requests may make the process unacceptably slow. However, because NPOT textures using mips are an error condition, there may be relatively few instances of them. In order to increase efficiency, the emulator may track how many textures are NPOT and which of those NPOT textures use mips. If there are no NPOT textures, the textures need not be examined and may bound.

The state of all of the textures may be tracked by using a general tally. For example, a variable "non_renderable_texture_count" may be created and initially set to 0. The non-renderable texture may be any texture that is NPOT and set to use mips. Any time a texture is added, deleted or modified, the non_renderable_texture_count may be updated. In this regard, the emulator may track the total number of textures which are both NPOT and use mips.

In order to identify when and which textures are created and deleted, the emulator may utilize wrapped versions of functions which generate texture names and delete named textures. For example, there may be wrapped versions of the functions glGenTextures and glDeleteTextures. When a texture is created, if it is NPOT and uses mips, the non_renderable_texture_count may be increased. This may allow the emulator to track the state of the textures. When the user calls such functions to complete some tasks, the wrapped version may be called to examine any changes to the textures. In one case, when a texture is deleted, if the texture is NPOT and uses mips (i.e., non-renderable), the non_renderable_texture_count is decreased. After the changes have been recorded, for example in the wrappers, the real version of the function may be called to complete the tasks identified by the user.

In order to identify which textures are NPOT and use mips, the emulator may use wrapped versions of functions that define the dimensions of a specific mip in a texture. This may include those functions which copy pixels into a 2D texture image, specify that a two-dimensional texture image in a compressed format, and specify a two-dimensional texture image may be wrapped. For example, there may be wrapped versions of glCopyTexImage2D, glCompressedTexImage2D, and glTexImage2D. When the user calls these functions, the wrapped version may be called first to examine any changes to these functions.

In one case, the mips may be numbered from 0 to N, where 0 is the largest mip in the texture and N is the smallest. If the user is defining mips 1 to N and the user specifies NPOT dimensions, the non_renderable_texture_count may be increased. If the user is defining mip 0 first using POT dimensions, but the texture was previously non-renderable (i.e., NPOT and using mips), non_renderable_texture_count may be decreased. Similarly, if the user selects new NPOT dimensions for the mips, non_renderable_texture_count may be increased. Once the wrapped version has identified any changes to non_renderable_texture_count, the real function (as requested by the user) may be called.

In order to identify which textures are NPOT and use mips, the emulator may use wrapped versions of functions that defined whether a texture uses mips. For example, functions which set texture parameters, such as glTexParameter, may be wrapped in order to track the setting of various associated features that define whether a texture is NPOT and uses mips. Thus, when the user calls the function glTexParameter, the emulator may call the wrapped version to examine any changes to this function and its associated features For example, glTexParameter may be used with the parameter GL_TEXTURE_MIN_FILTER. This function is a minifying function that may be used whenever the pixel being textured maps to an area greater than one texture element. If GL_TEXTURE_MIN_FILTER is set to GL_NEAREST_MIPMAP_NEAREST (which chooses the mip that most closely matches the size of the pixel being textured and uses the texture element nearest to the center of the pixel to produce a texture value), GL_NEAREST_MIPMAP_LINEAR (which chooses the two mips that most closely match the size of the pixel being textured and uses the texture element nearest to the center of the pixel to produce a texture value from each mip), or GL_LINEAR_MIPMAP_LINEAR (which chooses the two mipmaps that most closely match the size of the pixel being textured and uses the weighted average of the four texture elements that are closest to the center of the pixel to produce a texture value from each mip), then the texture may be non-renderable.

In another example, glTexParameter may be used with the parameter GL_TEXTURE_WRAP_S or GL_TEXTURE_WRAP_T, which set the wrap parameters for the texture coordinates S and T, respectively. GL_REPEAT may cause the integer part of the S coordinate to be ignored. As a result, only the fractional part of the coordinate is used and a repeating pattern is created. If the texture is NPOT, then setting GL_TEXTURE_WRAP_S or GL_TEXTURE_WRAP_T to GL_REPEAT may make the texture non-renderable.

In one example, before changing a setting, if the texture is currently not renderable, non_renderable_texture_count may be decreased, and if the new settings make the texture not renderable, non_renderable_texture_count may be increased.

By using wrapped versions of the functions described above, non_renderable_texture_count may always identify the total number of NPOT textures which use mips. If the non_renderable_texture_count is 0, the textures need not even be examined.

Figure 6:
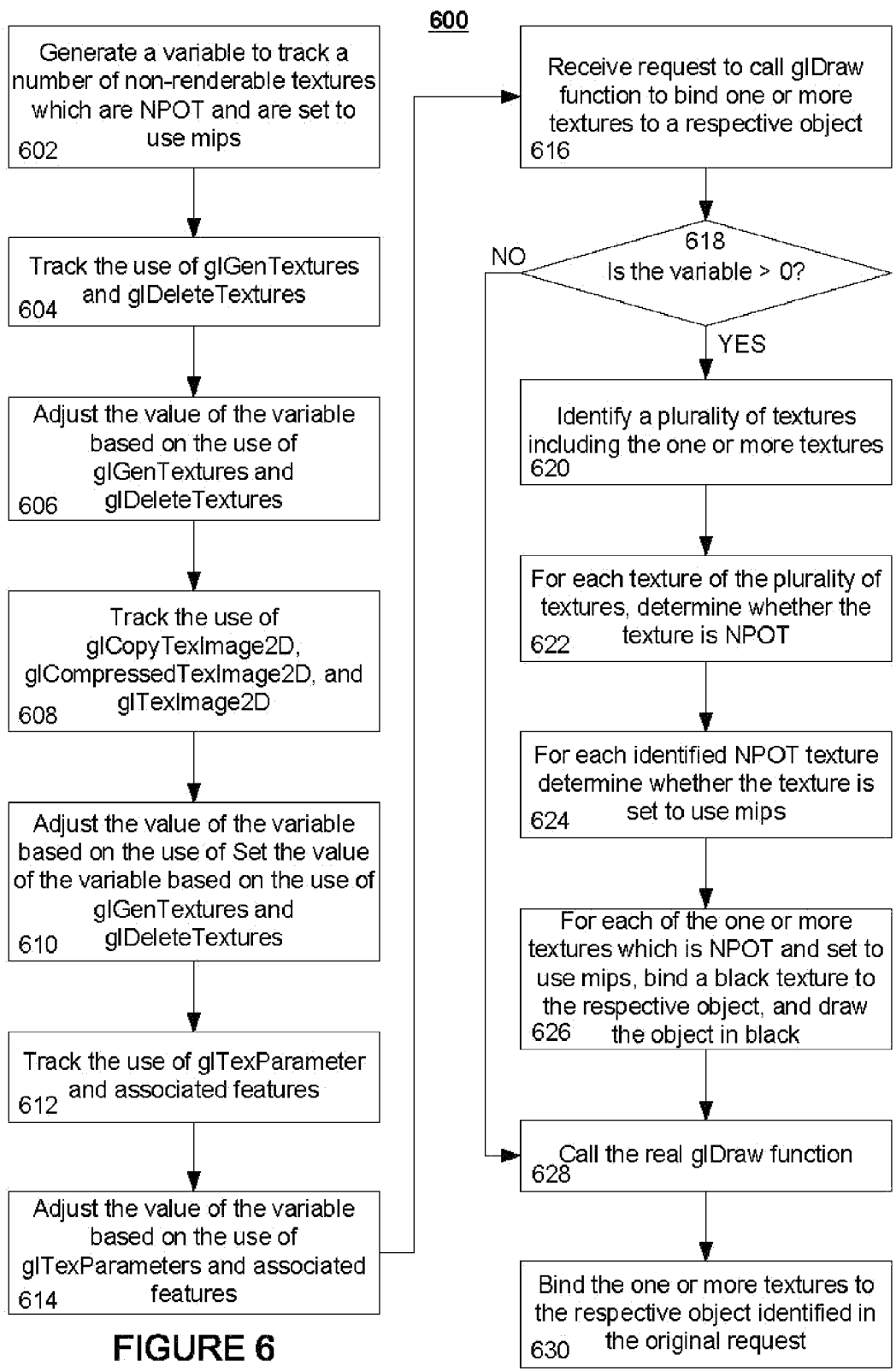
FIG. 6 is another flow diagram in accordance with an aspect of the invention.

As shown in flow diagram 600 of FIG. 6, an exemplary emulator program generates a variable to track a number of non-renderable textures which are NPOT and are set to use mips at block 602. The use of glGentTextures and glDeleteTextures is then tracked at block 604. The emulator then adjusts the variable based on the use of glGenTextures and glDeleteTextures at block 606. The use of glCopyTexImage2D, glCompressedTexImage2D, and glTexImage2D is also tracked at block 608. The emulator then adjusts the variable based on the use of glCopyTexImage2D, glCompressedTexImage2D, and glTexImage2D at block 610. The use of glTexParameter and associated features are tracked at block 612. The variable is adjusted based on the user of glTexParameter at block 614.

As shown in block 616, the emulator may receive a request to call a glDraw function to bind one or more textures to a respective object. At block 618, the emulator determines whether the variable is greater than 0. If so, at block 620, a plurality of textures, including the one or more textures, is identified. The plurality of textures may, for example, include all of the textures in the library. For each texture of the plurality of textures, the emulator determines whether the texture is NPOT at block 622. For each NPOT texture, the emulator determines whether the texture is set to use mips at block 624. For each of the one or more textures which is NPOT and set to use mips, the emulator binds a black texture to the respective object and draw the object in black at block 626. Next, the real glDraw function (as identified in the request) is called at block 628. The real glDraw function is then used to bind the one or more textures to the respective object identified in the original request at block 630.

Returning to block 618, if the variable is equal to 0, the emulator moves to block 628, and the real glDraw function (as identified in the request) is called. The real glDraw function is then used to bind the one or more textures to the respective object identified in the original request at block 630.

Although NPOT textures set to use mips may be considered an infrequent error condition, it is possible that a program drawing an object for display may use one. The results of drawing the object in black may not be obvious and the user may not even notice the issue. Therefore it may be even more beneficial in these circumstances to make the process even more efficient by not querying OpenGL and if tracking even more states.

In order to avoid having to query OpenGL to identify the state of the various textures, the emulator may track and record exactly which particular textures are going to be bound. In order to accomplish this, the emulator may use wrapped versions of functions which select an active texture unit and bind a named texture to a texturing target. For example, OpenGL has a set of texture binding locations numbered 0 to N. In one case, OpenGL ES 2.0 may require 16 locations. Each location may have two binding targets, a 2D binding target, and a cube map binding target. Thus, the emulator may call wrapped versions of glActiveTexture (which selects the texture binding location) and glBindTexture (which sets the binding targets of the current texture binding location), to keep track of which textures are used in which targets at which locations.

So if non_renderable_texture_count is greater than 0, the emulator would may have to examine all of the N texture binding locations to determine whether any of them are non-renderable. Again, if a texture is non-renderable, the emulator may bind a black texture in the wrapper as described above.

Figure 7:
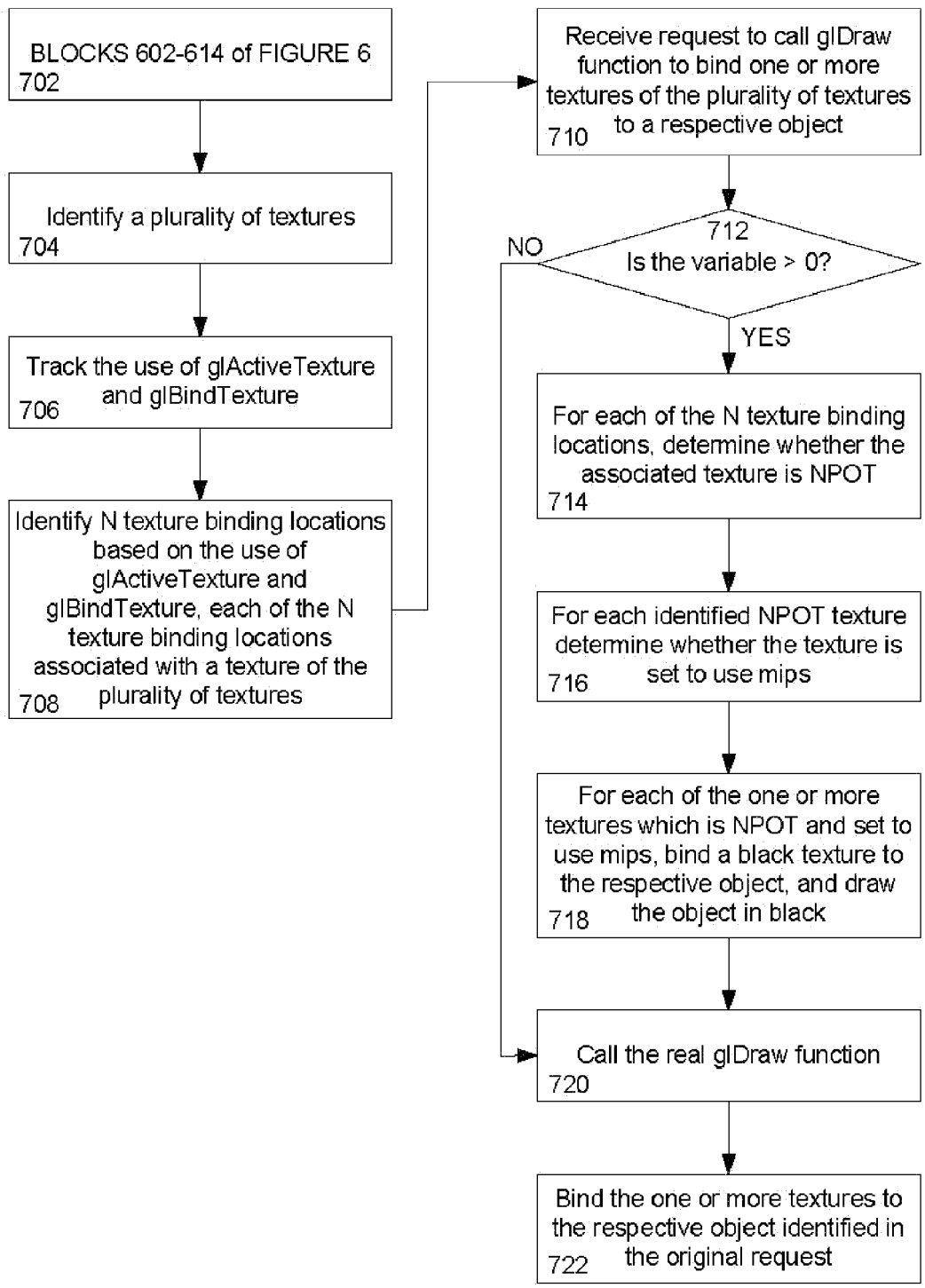
FIG. 7 is a further flow diagram in accordance with an aspect of the invention.

As shown in flow diagram 700 of FIG. 7, at block 702 the exemplary emulator program conducts the steps of blocks 602-614 of FIG. 6. At block 704, a plurality of textures is identified. The plurality of textures may include, for example, all of the textures in the library. At block 706, the emulator tracks the user of glActiveTexture and glBindTexture. At block 708, the emulator identifies N texture binding locations based on the use of glActiveTexture and glBindTexture. Each of the N texture binding locations is associated a respective texture of the plurality of textures.

As shown in block 710, the emulator may receive a request to call a glDraw function to bind one or more textures to a respective object. At block 712, the emulator determines whether the variable is greater than 0. If so, at block 714, for ach of the N texture binding locations, the emulator determines whether the associated texture is NPOT. For each NPOT texture, the emulator determines whether the texture is set to use mips at block 716. For each of the one or more textures which is NPOT and set to use mips, the emulator binds a black texture to the respective object and draw the object in black at block 718. Next, the real glDraw function (as identified in the request) is called at block 720. The real glDraw function is then used to bind the one or more textures to the respective object identified in the original request at block 722.

Returning to block 712, if the variable is equal to 0, the emulator moves to block 720, and the real glDraw function (as identified in the request) is called. The real glDraw function is then used to bind the one or more textures to the respective object identified in the original request at block 722.

If N is a large number, such as 16, checking N locations before calling a glDraw function may be a very slow process. In addition some implementations of OpenGL may support 32, 64, or more textures which may make it even slower. Generally, a user may utilize only a few textures, at a time. Therefore, in order to increase the efficiency, the emulator may track additional information to identify exactly which textures are being used.

For example, the emulator may track the shader programs described above. In order to identify when and which shader programs are being used, functions which link a program object, such as glLinkProgram, may be wrapped. These types of functions may determine whether two shader programs may operate together. If a link is successful, the shader may be queried to identify which uniform inputs are being used. This information may be stored by the glLinkProgram wrapper. Only after a link is successful can the shader be queried to determine whether any of the inputs are of the type texture.

For each uniform input which is a texture, in order to identify which actual texture (or texture location) it references, a wrapped version of the functions which specify the values for the uniform inputs to the shader program, such as glUniform, may be used. If the uniform input being set on the current program is of the type texture, the glUniform may identify which texture binding location is being used. This texture binding location may also be stored by the wrapped version.

Accordingly, when a user calls a glDraw function and if non_renderable_texture_count is greater than 0, instead of going through all of the texture binding locations, the emulator may used the wrapped functions to identify the specific textures being used. Thus, instead of examining N or more textures, the emulator may examine the wrapped versions of these features to identify only those textures which are actually being used by the current shader program.

Figure 8:
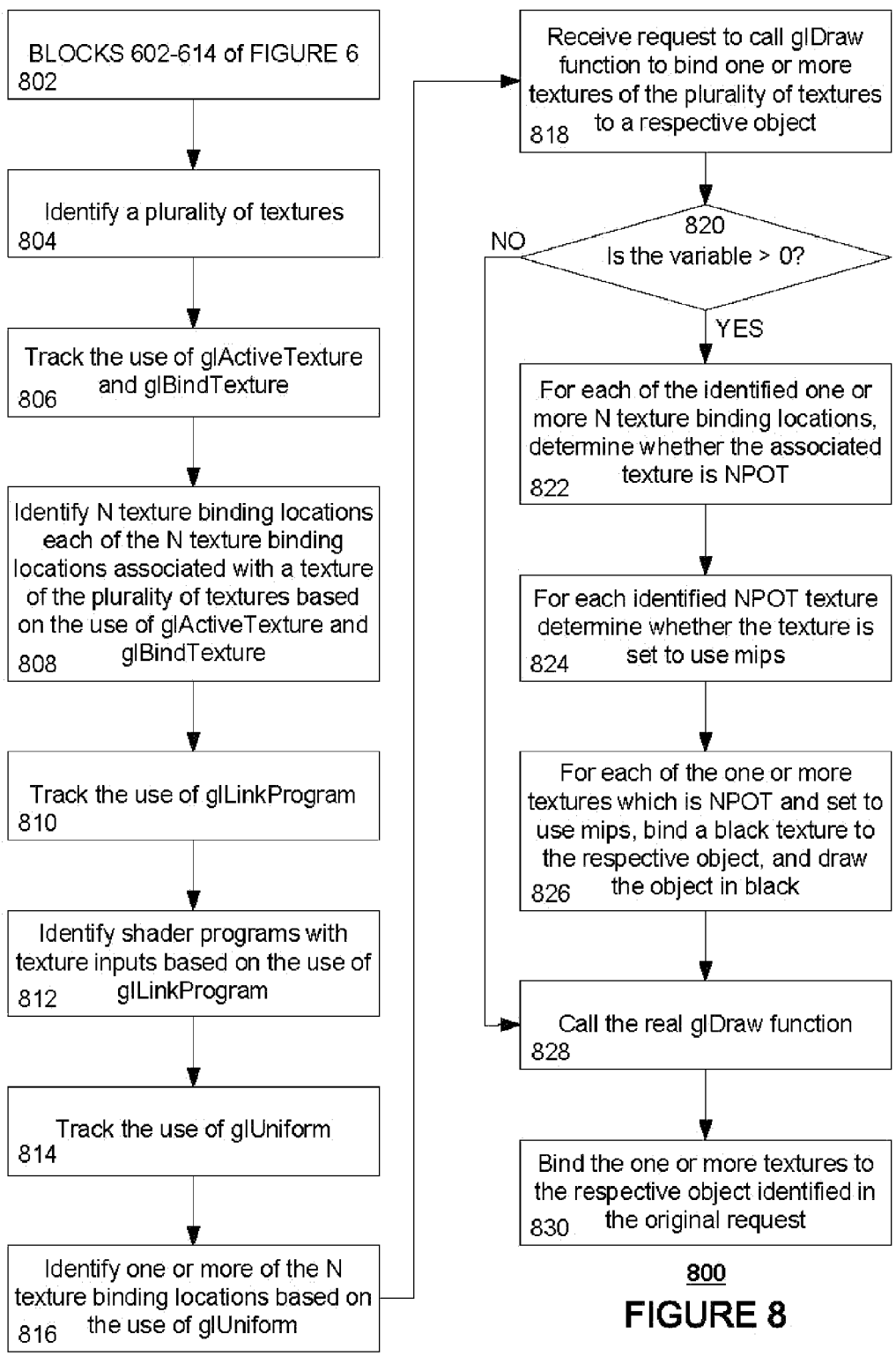
FIG. 8 is yet another further flow diagram in accordance with an aspect of the invention.

As shown in flow diagram 800 of FIG. 8, at block 802 the exemplary emulator program conducts the steps of blocks 602-614 of FIG. 6. At block 804, a plurality of textures is identified. The plurality of textures may, for example, include all of the textures in the library. At block 806, the emulator tracks the user of glActiveTexture and glBindTexture. At block 808, the emulator identifies N texture binding locations based on the use of glActiveTexture and glBindTexture. Each of the N texture binding locations is associated a respective texture of the plurality of textures. The emulator also tracks the use of glLinkProgram at block 810. At block 812, the emulator identifies shader programs with texture inputs based on the use of glLinkProgram. At block 814, the emulator tracks the use of glUniform. The emulator identifies one or more of the N binding locations based on the use of glUniform at block 816.

As shown in block 818, the emulator may receive a request to call a glDraw function to bind one or more textures to a respective object. At block 820, the emulator determines whether the variable is greater than 0. If so, at block 822, for each of the N identified one or more texture binding locations, the emulator determines whether the associated texture is NPOT. For each NPOT texture, the emulator determines whether the texture is set to use mips at block 824. For each of the one or more textures which is NPOT and set to use mips, the emulator binds a black texture to the respective object and draw the object in black at block 826. Next, the real glDraw function (as identified in the request) is called at block 828. The real glDraw function is then used to bind the one or more textures to the respective object identified in the original request at block 830.

Returning to block 820, if the variable is equal to 0, the emulator moves to block 828, and the real glDraw function (as identified in the request) is called. The real glDraw function is then used to bind the one or more textures to the respective object identified in the original request at block 830.

As these and other variations and combinations of the features discussed above can be utilized without departing from the invention as defined by the claims, the foregoing description of exemplary embodiments should be taken by way of illustration rather than by way of limitation of the invention as defined by the claims. It may also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method for binding textures and generating an image of an object using a graphics library including functions and elements, the method comprising:
   generating a variable to track a number of non power of two textures comprising a length dimension or a width dimension which is not a power of two, the non power of two textures being set to use mips;
   tracking the use of a first function;
   setting a value for the variable based on the use of the first function;
   receiving a request from a user to use a second function to bind one or more textures to the object and draw the object;
   when the value indicates that there are non power of two textures set to use mips, then:
   (a) identifying a plurality of textures including the one or more textures;
   (b) for each texture of the plurality of textures, determining, by one or more processors, whether the texture is an non power of two texture;
   (c) for each non power of two texture, determining whether the texture is set to use mips;
   (d) for each of the one or more textures which is an non power of two texture and set to use mips, binding a black texture to the object;
   (e) drawing the object in black;
   (f) calling the second function; and
   (g) after drawing the object in black, binding the one or more textures to the object.

2. The method of claim 1, further comprising when the value indicates that there are no non power of two textures set to use mips, then:
   (a) calling the second function; and
   (b) binding the one or more textures to the object.

3. The method of claim 1, further comprising, drawing any of the one or more non power of two textures set to use mips in black.

4. A computer-implemented method for binding textures and generating an image of an object using a graphics library including functions and elements, the method comprising:
   generating a variable to track a number of non power of two textures comprising a length dimension or a width dimension which is not a power of two, which are set to use mips;
   tracking the use of a first function;
   setting a value for the variable based on the use of the first function;
   tracking the use of a second function;

identifying, by one or more processors, a plurality of textures of the library;

identifying N texture binding locations based on the use of the second function, where each of the N texture binding location is associated with a respective texture of the plurality of textures;

receiving a request from a user to use a third function to bind one or more textures to the object and draw the object;

when the value indicates that there are non power of two textures set to use mips, then:

(a) for each of the N texture binding locations, the one or more processors determining whether the respective texture is an non power of two texture;

(b) for each non power of two texture, determining whether the texture is set to use mips;

(c) for each of the one or more textures which is an non power of two texture and set to use mips, binding a black texture to the object;

(d) drawing the object in black;

(e) calling the third function; and (f) after drawing the object in black, binding the one or more textures to the object.

5. The method of claim 4, further comprising, when the value indicates that there are no non power of two textures set to use mips:

(a) calling the first function; and (b) binding the one or more textures to the object.

6. The method of claim 4, further comprising drawing any of the one or more non power of two textures set to use mips in black.

7. A computer-implemented method for binding textures and generating an image of an object using a graphics library including functions and elements, the method comprising:

generating a variable to track a number of non-power of two textures each comprising a length dimension or a width dimension which is not a power of two, the non-power of two textures being set to use mips;

tracking the use of a first function;

setting a value for the variable based on the use of the first function;

tracking the use of a second function;

identifying, by one or more processors, a plurality of textures of the library;

identifying N texture binding locations based on the use of the second function, where each of the N texture binding locations is associated with a respective texture of the plurality of textures;

tracking the use of a third function;

identifying one or more of the N texture binding locations based on the use of the third function;

receiving a request from a user to use a fourth function to bind one or more textures to the object and draw the object;

when the value indicates that there are non-power of two textures set to use mips, then:

(a) for each of the identified one or more N texture binding locations, determining by the one or more processors whether the respective texture is an non power of two texture;

(b) for each non power of two texture, determining whether the texture is set to use mips;

(c) for each of the one or more textures which is an non power of two texture and set to use mips, binding a black texture to the object;

(d) drawing the object in black;

(e) calling the fourth function; and (f) after drawing the object in black, binding the one or more textures to the object.

8. The method of claim 7, further comprising, when the value indicates that there are no non power of two textures set to use mips, then:

(a) calling the first function; and (b) binding the one or more textures to the object.

9. The method of claim 7, further comprising drawing any of the one or more non power of two textures set to use mips in black.

10. A computer comprising:

memory storing a graphics library including functions and elements for binding textures and generating an image of an object;

one or more processors configured to:

generate a variable to track a number of non power of two textures comprising a length dimension or a width dimension which is not a power of two, the non power of two textures being set to use mips;

track use of a first function;

set a value for the variable based on the use of the first function;

receive a request from a user to use a second function to bind one or more textures to the object and draw the object;

when the value indicates that there are non power of two textures set to use mips, then:

(a) identify a plurality of textures including the one or more textures;

(b) for each texture of the plurality of textures, determine whether the texture is an non power of two texture;

(c) for each non power of two texture, determine whether the texture is set to use mips;

(d) for each of the one or more textures which is an non power of two texture and set to use mips, bind a black texture to the object;

(e) draw the object in black;

(f) call the second function; and (g) after the object is drawn in black, bind the one or more textures to the object.

11. The computer of claim 10, wherein when the value indicates that there are no non power of two textures set to use mips, the one or more processors are further operable to:

(a) call the second function; and (b) bind the one or more textures to the object.

12. The computer of claim 10, wherein the one or more processors are further operable to draw any of the one or more non power of two textures set to use mips in black.

13. A computer comprising:

memory storing a graphics library including functions and elements for binding textures and generating an image of an object;

one or more processors configured to:

generate a variable to track a number of non power of two textures comprising a length dimension or a width dimension which is not a power of two, which are set to use mips;

track use of a first function;

set a value for the variable based on the use of the first function;

track use of a second function;

identify a plurality of textures of the library;

identify N texture binding locations based on the use of the second function, where each of the N texture binding location is associated with a respective texture of the plurality of textures;

receive a request from a user to use a third function to bind one or more textures to the object and draw the object;

when the value indicates that there are non power of two textures set to use mips, then:
(a) for each of the N texture binding locations, determine whether the respective texture is an non power of two texture;
(b) for each non power of two texture, determine whether the texture is set to use mips;
(c) for each of the one or more textures which is an non power of two texture and set to use mips, bind a black texture to the object;
(d) draw the object in black;
(e) call the third function; and
(f) after the object is drawn in black, bind the one or more textures to the object.

14. The computer of claim 13, wherein when the value indicates that there are no non power of two textures set to use mips, the processor is further operable to:
(a) call the first function; and
(b) bind the one or more textures to the object.

15. The computer of claim 13, wherein the one or more processors are further operable to draw any of the one or more non power of two textures set to use mips in black.

16. A computer comprising:
memory storing a graphics library including functions and elements for binding textures and generating an image of an object;
one or more processors configured to:
generate a variable to track a number of non power of two textures each comprising a length dimension or a width dimension which is not a power of two, the non power of two textures being set to use mips;
track use of a first function;
set a value for the variable based on the use of the first function;
track use of a second function;
identify a plurality of textures of the library;
identify N texture binding locations based on the use of the second function, where each of the N texture binding locations is associated with a respective texture of the plurality of textures;
track use of a third function;
identify one or more of the N texture binding locations based on the use of the third function;
receive a request from a user to use a fourth function to bind one or more textures to the object and draw the object;
when the value indicates that there are non power of two textures set to use mips, then:
(a) for each of the identified one or more N texture binding locations, determine whether the respective texture is an non power of two texture;
(b) for each non power of two texture, determine whether the texture is set to use mips;
(c) for each of the one or more textures which is an non power of two texture and set to use mips, bind a black texture to the object;
(d) draw the object in black;
(e) call the fourth function; and
(f) after the object is drawn in black, bind the one or more textures to the object.

17. The computer of claim 16, wherein when the value indicates that there are no non power of two textures set to use mips, the processor further operable to:
(a) call the first function; and
(b) bind the one or more textures to the object.

18. The computer of claim 16, wherein the processor further operable to draw any of the one or more non power of two textures set to use mips in black.

* * * * *